United States Patent [19]

Knopp

[11] 4,174,919
[45] Nov. 20, 1979

[54] HOLDER FOR A TANGENTIAL CHASING TOOL

[75] Inventor: Ingolf Knopp, Tuebingen, Fed. Rep. of Germany

[73] Assignee: Gustav Wagner Maschinenfabrik, Reutlingen, Fed. Rep. of Germany

[21] Appl. No.: 910,665

[22] Filed: May 30, 1978

[30] Foreign Application Priority Data

Jun. 18, 1977 [DE] Fed. Rep. of Germany ....... 2727498

[51] Int. Cl.² .............................................. B23B 51/00
[52] U.S. Cl. ..................................... 408/151; 408/153
[58] Field of Search ........................ 408/151, 153, 158

[56] References Cited

U.S. PATENT DOCUMENTS

| | | | |
|---|---|---|---|
| 1,354,305 | 9/1920 | Johnson | 408/151 |
| 2,079,853 | 5/1937 | Greenwood et al. | 408/158 |
| 2,239,736 | 4/1941 | Reimschissel et al. | 408/153 |
| 4,097,178 | 6/1978 | Newell | 408/153 |

*Primary Examiner*—Harrison L. Hinson
*Attorney, Agent, or Firm*—W. G. Fasse; D. F. Gould

[57] ABSTRACT

A holder for a tangential chasing tool is supported in a tiltable manner in a thread cutter head which opens automatically. The holder has a chaser seat as well as a clamping plate including a guide claw. The clamping plate secures the dovetail portion of the chaser tool with the aid of a clamping jaw and two clamping screws. Exchangeable intermediate disks having different wedging angles, are insertable into the chaser seat. The bottom edge of said guide claw of the clamping plate has a convex shape, whereby the chaser tool is securely held in the holder without the need for a plurality of chaser holder sets and without any substantial modification of the holder structure.

5 Claims, 3 Drawing Figures

HOLDER FOR A TANGENTIAL CHASING TOOL

BACKGROUND OF THE INVENTION

The present invention relates to a holder for a tangential chasing tool. Such tools are used for cutting threads. Hereafter the chasing tool will be called "chaser".

It is required to align or adjust the chaser in its holder to an angular tolerance within the range of about ±0.3° relative to the pitch angle of a threading to be cut. The chaser must be clamped tightly in the adjusted position. Therefore, it has been necessary heretofore to provide a plurality of holder sets for one core diameter cutting range. These holder sets divide the sum total of the pitch angles of all standardized threads within said core diameter cutting range and within the above mentioned angular tolerance of about ±0.3°.

The total range of a thread cutting head thus required heretofore a large number of chaser holders. In order to reduce this large number of chaser holders, it is known from German Patent Publication (DOS) No. 2,626,119 to provide but one chaser holder for one, or rather for each, core diameter cutting range. A set of such holders comprises four holders. Each holder according to said German Patent Publication 2,626,119 is adapted to hold a cassette having a dovetail shaped cross-section. In the cassette, in turn, there are provided the holding means for the tangential chaser. The holding means are also dovetail shaped and arranged at an angle corresponding to the required chaser pitch angle. The respective back surface of the cassette, between the surfaces of the dovetail which are tilted against each other, is milled from both ends. These zones are milled and displaced relative to each other to make the zones elastic and in order to securely clamp the chaser in its cassette as well as the cassette itself. Besides, the back wall of the cassette may also be constructed to be elastic.

The just described device according to said German Patent Publication 2,626,119 achieves a reduction in the number of sets of chaser holders as compared to other prior art structures. Hence costs are reduced, since a cassette is always less expensive than a chaser holder. However, the cassette which encircles the respective chaser dovetail, calls for a substantially wider and deeper chaser seat in the chaser holder as compared to a chaser seat required to hold only the dovetail of the chaser rather than the cassette with a chaser dovetail therein. Thus, the chaser holder constructed for holding a cassette must be made substantially larger than heretofore, if it is required that the holder has the same stiffness as ordinary holders. Besides, cassette holders make it necessary to position the chaser adjustment screw into a pulpit member which reaches above the cassette and which initially does not constitute an integral structure with the chase holder. The pulpit member is subsequently installed and anchored in the chaser holder which itself requires much space. Thus, the structure of the chaser holder becomes even more bulky. Consequently, only a minor fraction of the originally expected savings is actually achieved.

A device for adjusting the pitch angle of the tangential cutting jaws of a thread cutter head is also known in the art. Said device uses sets of intermediate layers or washers inserted into the grooves for the cutting jaws. These intermediate layers or washers have a support surface which is inclined crosswise where the respective angle of inclination corresponds to the pitch angle. However, the cutting jaws does not rest rigidly in the holder, because the groove for the supporting of a clamping iron, which holds a cutting jaw, always has the same inclination and therefore the clamping iron does not rest with a surface and/or in the groove, when different intermediate layers or washers are used.

OBJECTS OF THE INVENTION

In view of the above it is the aim of the invention to achieve the following objects singly or in combination:

to construct a holder for a chaser which does not require a plurality of chaser holder sets, yet assures a fixed position of the chaser in the holder without requiring a substantial change of the holder construction;

to adapt the holder for accommodating different angular positions of the chaser by using exchangeable insert disks which have different wedging angles thereby providing a variable angularity for the chaser holder;

to assure that the chaser will be clamped securely in any angular position as determined by the exchangeable intermediate insert disks; and to maintain the insert disk in position independently of any adjustment of the chaser.

SUMMARY OF THE INVENTION

According to the invention there is provided a holder for a tangential chaser, which holder is tiltably supported in a self-opening thread cutter head having a chaser seat and a clamping plate including a guide claw. The clamping plate secures the dovetail portion of the chaser by means of a clamping jaw and two clamping screws. Exchangeable, wedge shaped intermediate disks are inserted into the chaser seat. These disks have different wedge angles to provide for different angular positions of the chaser. The bottom edge of the guide claw of the clamping plate has a convex shape, whereby a defined point of contact is rigidly established in the area of said clamping screws, preferably intermediate said screws which help defining said point of contact between said convex shape of the guide claw and the guide groove. The just described construction of the holder according to the invention makes it possible initially to leave the chaser seat in the chaser holder unchanged, in other words, to leave the seat as it was constructed for holding a conventional dovetail portion of a chaser constructed specifically for that particular holder. The portion of the chaser holder laterally adjacent to the chaser is increased in height just sufficiently, so that the exchangeable, intermediate disk may be inserted under the slanted surface of the chaser which faces the journal pin of the chaser holder. The chaser seat located under the intermediate disk is machined into the chaser holder so as to have a basic holder angle. Such basic holder angle corresponds to a mean or average thread pitch angle which is determined by taking into account all threads to be cut by the particular chaser holder within the core diameter cutting range of the chaser holder. Thus, the exchangeable intermediate disk merely takes up or compensates the difference angle between said basic holder angle and the actual holder angle corresponding to the desired thread pitch angle. For this purpose the intermediate disk either tapers toward the center of the thread cutter head or it tapers away from said thread cutter head center. The holder angle is selected to be about 0.6° larger than the actual thread pitch angle in order to realize such actual thread pitch angle.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
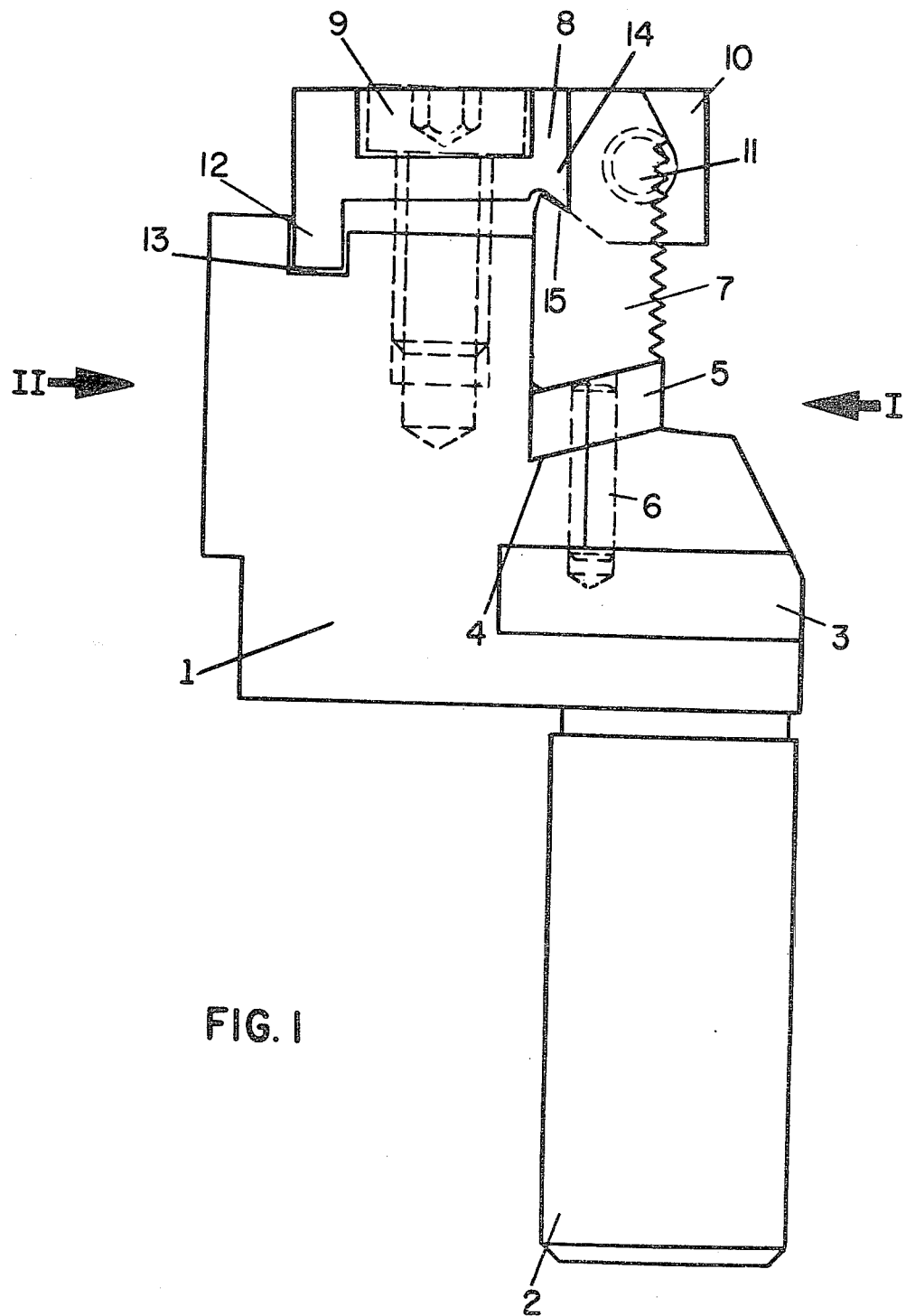
FIG. 1 is a view of the chaser holder as viewed from the center of the thread cutter head.

Referring to FIG. 1, the chaser holder 1 is tiltably supported by means of its journal pin 2 in a thread cutting head not shown. The chaser holder is held against axial displacement through its entire tilting or adjustment range, and thus through its thread cutting range, by means of holding elements which grip into its holding groove 3 on the side of the thread cutting head. Further, the chaser holder rests by means of a conventional slide member not shown, in a spiral groove of the thread cutting head.

An exchangeable, intermediate disk 5 is located between the chaser seat 4 and the tangential chaser 7, only the facing side of the chaser being visible in the illustration. A pin 6, shown by dashed lines, prevents the disk 5 from being entrained by the tangential chaser 7, when the latter is adjusted. The tangential chaser is clamped down above the intermediate disk 5 by means of the clamping plate 8 and two screws 9 arranged in a row. Further the chaser 7 is supported rearwardly by an adjustment screw 11 located in an extension 10 of the clamping plate 8. The clamping plate 8 is also guided by means of its guide claw 12 reaching into the guide groove 13. Further, the clamping plate 8 reaches with its clamping jaw 14 behind the upper dovetail side 15 of the chaser 7.

Figure 2:
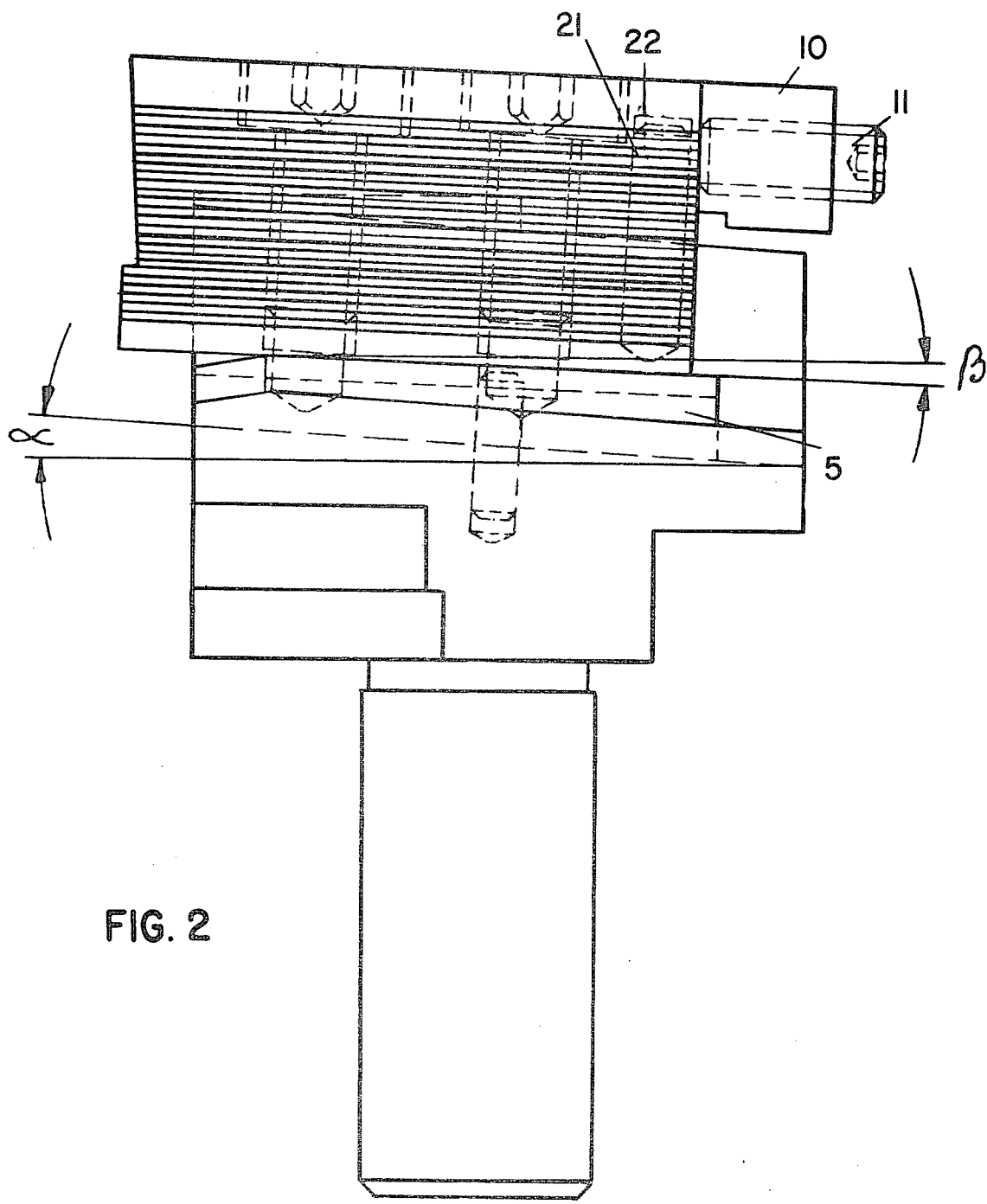
FIG. 2 shows a view of the chaser holder as viewed in the direction of the arrow I in FIG. 1.

FIG. 2 shows how the large, mean, basic holder angle $\alpha$ is transformed into the small, for example given, actual holder angle $\beta$, by means of the intermediate disk 5 which is exchangeable and which tapers toward the thread cutter head center 16. If the exchangeable intermediate disk 5 tapers in the opposite direction, that is, toward its end facing the adjustment screw 11, then the angle $\beta$ will become larger than the angle $\alpha$.

Figure 3:
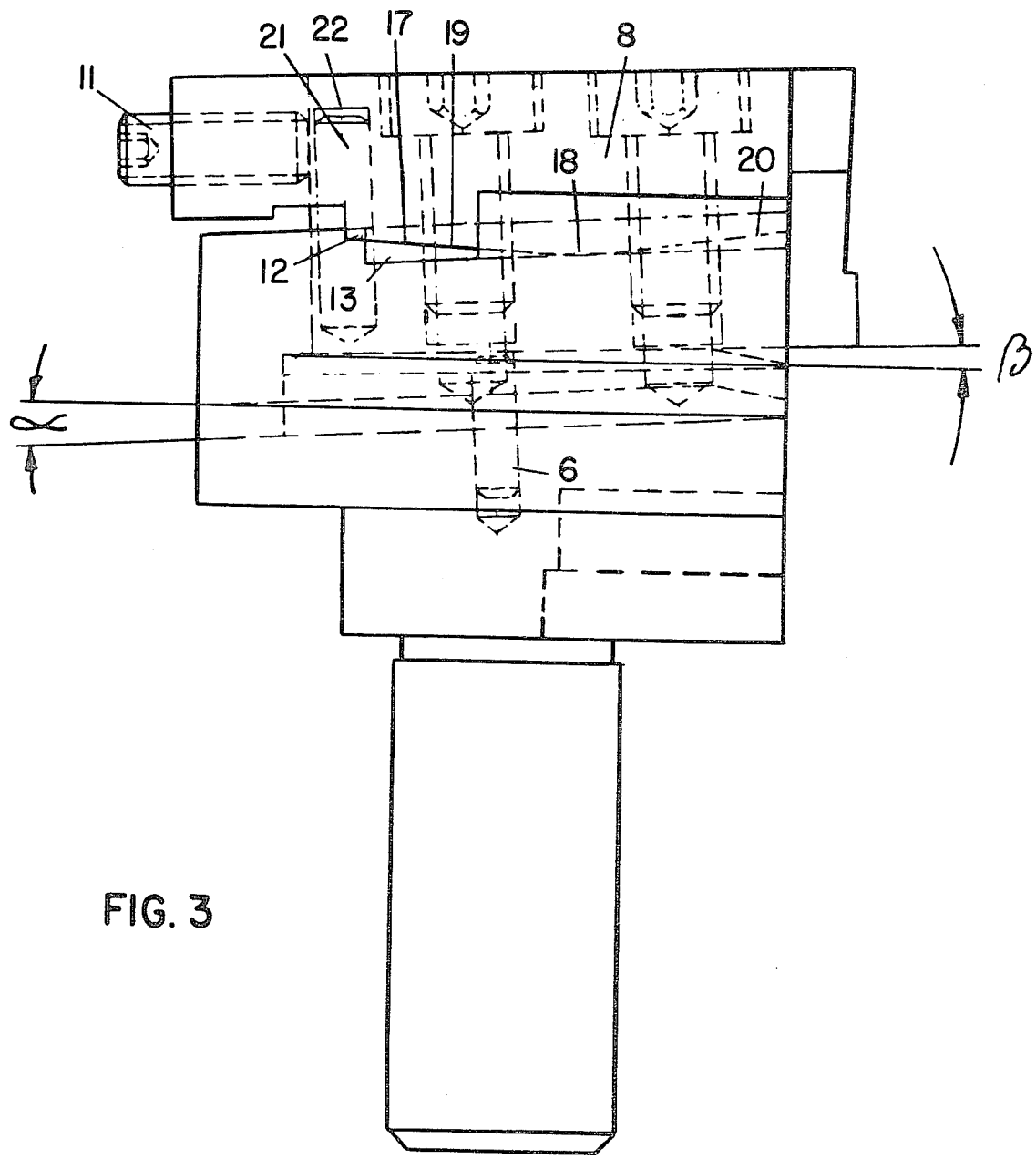
FIG. 3 is an illustration of the chaser holder as viewed in the direction of the arrow II in FIG. 2.

FIG. 3 shows the guide claw 12 which is also shown in FIG. 1, of the clamping plate. The lower edge 17 of the guide claw 12 is especially visible in FIG. 3. The guide claw 12 grips into the guide groove 13. Hence the guide claw 12 is shown in dashed lines. FIG. 3 also shows the two straight lines 19 and 20 extending in opposite directions tangentially relative to the circle section 18. Thus, the guide claw 12 in the guide groove 13 may adjust its position to the angle determined by the intermediate disk 5, substantially in the manner of a curved rocker bar. This adjustment of the angular position of the guide claw 12 is facilitated, if the surfaces of all given, different angles exhibiting intermediate disks have a common rotational axis in an imaginary plane which extends perpendicularly to the plane of the drawing of FIG. 3. Said imaginary plane must further extend centrally between the two clamping screw passages 9 and through the center of the circle 18.

In order to assure a good clamping of the tangential chaser 7, the radius of the circle 18 is selected so that its contact points in the guide groove 13 remain with certainty within about one third of the spacing between the two clamping screws 9 for all the various, predetermined angular positions of the clamping plate 8. The just mentioned "one third" extends with an equal length on both sides of the above defined, imaginary plane. The depth of the guide groove 13 and thus the height of the guide claw 12 are selected so that none of the two ends of the bow shaped or rocker shaped bottom edge of the guide claw 12 extends out of the guide groove 13 at any of the different, predetermined angular positions of the guide claw 12. The clamping plate 8 is provided with a recess 22 which is not visible from the outside. A pin 21 secured in the chaser holder 1 engages said recess 22 of the clamping plate 8 in order to prevent that the clamping screws 9 must take up the counter cutting force through the c lamping plate 8. This counter cutting force is generated by the tangential chaser and is effective on the adjustment screw 11.

It has been found that in a given core diameter cutting range the pitch angles of all standardized threads fall into a very small range of angles, for example from 1 to 7 degrees. If one places the chaser seat into the chaser holder at an angle corresponding to the mean basic holder angle of 4.6 degrees, the exchangeable, intermediate disk must take up only an angle of ±3 degrees at the most in accordance with the holder angle which corresponds to the largest or smallest thread pitch angle. Thus, it is possible to make the intermediate disk only 3.5 mm thick, when it has a length of, for example, 30 mm. Thus, according to the invention the chaser holder for this example needs to be only 3.5 mm higher than heretofore.

Another advantage of the invention is seen in that the angularity of the chaser is variable, because the intermediate chaser disks 5 are exchangeable, whereby the free, inclined dovetail surface of the chaser also lies at an angle relative to the clamping jaw 14 of the clamping plate 8. As mentioned above, the clamping plate 8 is guided on its side facing away from the chaser 7 by means of its guide claw 12 riding in the guide groove 13 of the chaser holder. Incidentally, the guide groove 13 extends in parallel to the chaser seat, because sets of milling bits are used for the milling.

The above mentioned feature of the invention, namely to make the guide claw 12 of the clamping plate 8 higher and the guide groove 13 in the chaser holder correspondingly deeper than heretofore, has the advantage that the chaser is securely held in any of its angular positions, into which the chaser is forced by the exchangeable intermediate disk or disks 5. Further, the feature of shaping the bottom edge 17 of the guide claw 12 so as to correspond to a circular arc at the level of the center between the two clamping screw passages 9 has the advantage, as compared to the prior art wherein the bottom edge of the guide claw extends in parallel to the clamping jaw, that the clamping plate 8 may take up any desired angular position relative to its guide claw 12, similar to the angle between the floor and a rocker bar. This is so, because the position of the clamping plate 8 is geometrically definitely determined at all times by a straight line, namely the clamping jaw, and a point, namely the point of contact between the circular arc 18 of the guide claw 12 and the guide groove 13, and provided further that the surfaces of the exchangeable intermediate disks 5, which extend in various angular positions, have a common rotational axis also located at the level of the center between the two clamping screw passages 9. Incidentally, the above mentioned circular arc is contacted by tangents extending away to both sides at angles which, for safety's sake, are somewhat larger than the extreme angles of the exchangeable intermediate disk 5.

The adjustment screw 11 is not inserted into the chaser holder as heretofore, but rather it is inserted into an extension of the clamping plate 8. However, in order to avoid additionally loading the clamping screws 9 through the clamping plate 8 by the cutting counter force which is partially effective on the adjustment screw 11, said recess 22 is provided adjacent to said extension. The recess is not visible from above, but receives said pin 21 which is inserted into the chaser holder 7 in order to take up the prorated portion of the cutting counter force.

The above mentioned pin 6 which is inserted into the basic chaser seat and which extends coaxially to the journal pin of the holder, reaches into a bore or recess in the intermediate disk 5 in order to prevent a corresponding displacement of the intermediate disk 5 when the chaser is adjusted.

Although the invention has been described with reference to specific example embodiments, it will be appreciated that it is intended to cover all modifications and equivalents within the scope of the appended claims.

What is claimed is:

1. A holder for securing a tangential chasing tool including a dovetail portion in a thread cutter head, comprising chaser seat means in said thread cutter head, clamping plate
means including guide claw means for securing said chasing tool in said thread cutter head, said clamping plate means comprising clamping jaw means and clamping screw means for securing said dovetail portion of said chasing tool, exchangeable, wedge shaped intermediate disk means having different wedging angles and insertable into said chaser seat, said guide claw means of said clamping plate means having a bottom edge forming a convex arc.

2. The holder of claim 1, further comprising means tiltably supporting said chasing tool in said holder, pin means extending coaxially relative to said supporting means and into said chaser seat means, and recess means in said intermediate disk means, said pin means extending into said recess for preventing any unintended displacement of said intermediate disk means.

3. The holder of claim 1, wherein said convex arc is a circular arc forming said bottom edge of said guide claw means of said clamping plate means, said clamping screw means comprising two clamping screws spaced from each other, said circular arc having a center located in a plane extending through the middle between said two clamping screws.

4. The holder of claim 1, comprising further pin means, said clamping plate means comprising further recess means, said further pin means extending into said further recess means, said further pin means being externally invisible.

5. The holder of claim 1, wherein said clamping screw means comprise two clamping screws spaced from each other, wherein said intermediate disk means comprise a plurality of exchangeable disks each having a different wedging angle whereby surfaces of different disks may take up different positions, and wherein said disk means comprise a common rotational axis extending perpendicularly to the chaser seat means and through the middle between said two clamping screws.

* * * * *